(12) United States Patent
Kupratis (10) Patent No.: US 9,341,121 B2
(45) Date of Patent: May 17, 2016

(54) GAS TURBINE ENGINE WITH INTERCOOLING TURBINE SECTION AND INTERCOOLING TURBINE SECTION BYPASS

(71) Applicant: UNITED TECHNOLOGIES CORPORATION, Farmington, CT (US)

(72) Inventor: Daniel B. Kupratis, Wallingford, CT (US)

(73) Assignee: United Technologies Corporation, Farmington, CT (US)

(*) Notice: Subject to any disclaimer, the term of this patent is extended or adjusted under 35 U.S.C. 154(b) by 0 days.

(21) Appl. No.: 14/569,282

(22) Filed: Dec. 12, 2014

(65) Prior Publication Data
US 2015/0252732 A1 Sep. 10, 2015

Related U.S. Application Data

(60) Provisional application No. 61/915,885, filed on Dec. 13, 2013.

(51) Int. Cl.
*F02K 3/02* (2006.01)
*F02C 9/18* (2006.01)
*F02K 3/075* (2006.01)
*F02K 3/077* (2006.01)
*F02C 7/143* (2006.01)

(52) U.S. Cl.
CPC . *F02C 9/18* (2013.01); *F02C 7/143* (2013.01); *F02K 3/025* (2013.01); *F02K 3/075* (2013.01); *F02K 3/077* (2013.01)

(58) Field of Classification Search
CPC ............. F02K 3/00; F02K 3/075; F02K 3/02; F02C 7/143; F02C 7/141
See application file for complete search history.

(56) References Cited

U.S. PATENT DOCUMENTS 5,125,597 A * 6/1992 Coffinberry ............... 244/118.5
2005/0138914 A1* 6/2005 Paul ............................ 60/226.1

* cited by examiner

*Primary Examiner* — Gerald L Sung
(74) *Attorney, Agent, or Firm* — Cantor Colburn LLP (57) ABSTRACT

A gas turbine engine includes an intercooling turbine section to selectively cool the core flow. An intercooling turbine section bypass is also included to selectively bypass at least a portion of a core flow through an intercooling turbine section bypass path around the intercooling turbine section.

30 Claims, 10 Drawing Sheets

GAS TURBINE ENGINE WITH INTERCOOLING TURBINE SECTION AND INTERCOOLING TURBINE SECTION BYPASS

CROSS REFERENCE TO RELATED APPLICATION

This application claims the benefit of and incorporates by reference herein the disclosure of U.S. Ser. No. 61/915,885, filed Dec. 13, 2013.

GOVERNMENT LICENSE RIGHTS

This invention was made with government support under Contract No. FA8650-09-D-2923 Order 0013 awarded by the United States Air Force. The government has certain rights in the invention.

BACKGROUND

The present disclosure relates to gas turbine engines, and more particularly to a variable cycle gas turbine engine.

Variable cycle engines power high performance aircraft over a range of operating conditions yet achieve countervailing objectives such as high specific thrust and low fuel consumption. The variable cycle engine essentially alters a bypass ratio during flight to match requirements. This facilitates efficient performance over a broad range of altitudes and flight conditions to generate high thrust when needed for high energy maneuvers yet also optimize fuel efficiency for cruise and loiter conditions.

SUMMARY

In one embodiment, a gas turbine engine is disclosed comprising: a combustor section; a first spool along an engine axis with a first turbine section, said first turbine section forward of said combustor section to receive a core flow along a core flow path; a second spool along said engine axis with a low pressure compressor section and a second turbine section, said low pressure compressor section aft of said combustor section to receive said core flow along said core flow path; a first intercooling turbine section forward of said combustor section to receive said core flow along said core flow path; a first intercooling turbine section bypass to selectively bypass at least a portion of said core flow through a first intercooling turbine section bypass path around said first intercooling turbine section; a second intercooling turbine section aft of said combustor section to receive said core flow along said core flow path; and a second intercooling turbine section bypass to selectively bypass at least a portion of said core flow through a second intercooling turbine section bypass path around said second intercooling turbine section.

In another embodiment, a gas turbine engine is disclosed comprising: a combustor section; a first spool along an engine axis with a first turbine section, said first turbine section downstream of said combustor section to receive a core flow along a core flow path; a second spool along said engine axis with a low pressure compressor section and a second turbine section, said low pressure compressor section upstream of said combustor section to receive said core flow along said core flow path; a first intercooling turbine section upstream of said combustor section to receive said core flow along said core flow path; a first intercooling turbine section bypass to selectively bypass at least a portion of said core flow through a first intercooling turbine section bypass path around said first intercooling turbine section; a second intercooling turbine section upstream of said combustor section to receive said core flow along said core flow path; and a second intercooling turbine section bypass to selectively bypass at least a portion of said core flow through a second intercooling turbine section bypass path around said second intercooling turbine section.

Other embodiments are also disclosed.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
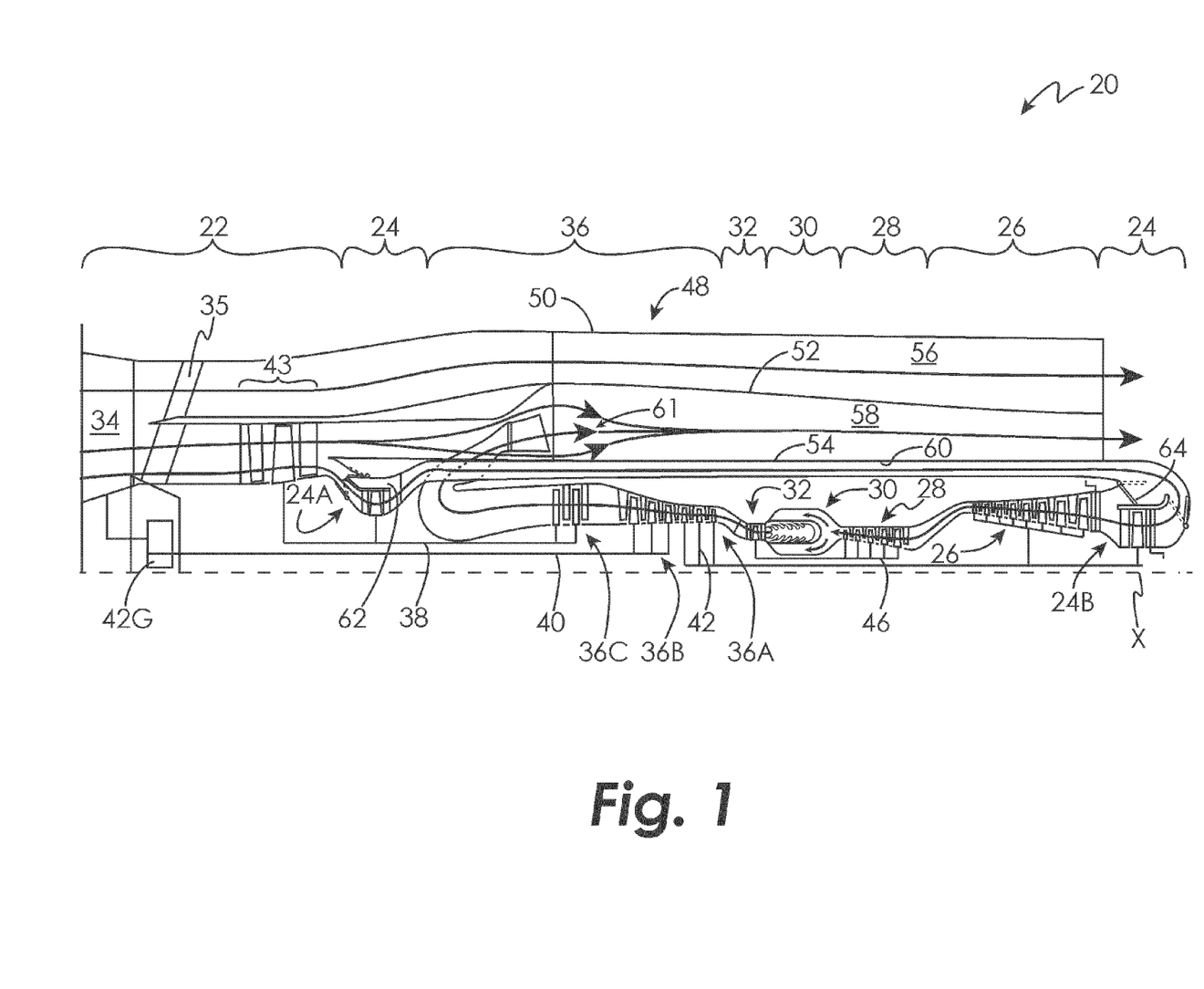
FIG. 1 is a general schematic view of an exemplary variable cycle gas turbine engine according to one non-limiting embodiment.

FIG. 1 schematically illustrates a gas turbine engine 20. The gas turbine engine 20 is disclosed herein in some embodiments as a variable cycle reverse core four-spool high bypass turbofan that generally includes a fan section 22, an intercooling turbine section (ICT) 24, a low pressure compressor section (LPC) 26, a high pressure compressor section (HPC) 28, a combustor section 30, a high pressure turbine section (HPT) 32, and a low pressure turbine section (LPT) 36. Additional sections may include a nozzle section (not shown), an augmentor section (not shown), various duct sections (not shown), and a geared architecture 42G among other systems or features. The sections are defined along a central longitudinal engine axis X.

The engine 20 generally includes a first spool coupled by shaft 38 (illustrated schematically), a second spool coupled by shaft 40 (illustrated schematically), a third spool coupled by shaft 42 (illustrated schematically) and a fourth spool coupled by shaft 46 (illustrated schematically), all of which rotate about the engine central longitudinal axis X relative to an engine case structure 48. The engine case structure 48 generally includes an outer case structure 50, an intermediate case structure 52 and an inner case structure 54. It should be understood that various structures individually or collectively within the engine may define the case structures 50, 52, 54 to essentially define an exoskeleton that supports the first through fourth spools for rotation therein.

The fan section 22 generally includes a bypass fan 34 and a multi-stage fan 43. The second spool shaft 40 drives the bypass fan 34 directly or through a geared architecture 42G to drive the bypass fan 34 at a lower speed than the second spool shaft 40. The geared architecture 42G may comprise a planetary gear or a star gear. The bypass fan 34 communicates fan flow through an exit guide vane 35 and into a bypass flow path 56, a second stream bypass flow path 58, and a core flow path 60.

The ICT 24 communicates fan flow into the core flow path 60. The ICT 24 facilitates the selective expansion of the airflow to a lower temperature than at the exit of the multi-stage fan 43 and therefore the inlet temperature to the LPC 26 is reduced. The ICT 24 comprises a first ICT 24A and a second ICT 24B in serial flow communication within the core flow path 60. The ICT section 24 is upstream of the LPC 26 such that all flow from the ICT section 24 is communicated to the input of the LPC 26.

The HPC 28, the combustor section 30, the HPT 32, the first LPT 36A, the second LPT 36B and the third LPT 36C are also in the core flow path 60. The core airflow is compressed by the fan section 22, expanded limitedly by the ICT 24, compressed monotonically by the LPC 26 and HPC 28, mixed and burned with fuel in the combustor section 30, then expanded over the HPT 32 and the LPT 36. The turbines 32, 36A, 36B and 36C rotationally drive respectively the shafts 46, 42, 40 and 38 in response to the expansion. The limited expansion of the core flow by the ICT 24A rotationally drives the first shaft 38 as a supplement to the LPT 36C, while the limited expansion of the core flow by the ICT 24B rotationally drives the third shaft 42 as a supplement to the LPT 36A.

The bypass flow path 56 is generally defined by the outer case structure 50 and the intermediate case structure 52. The second stream bypass flowpath 58 is generally defined by the intermediate case structure 52 and the inner case structure 54. The core flow path 60 is generally defined by the inner case structure 54. The second stream bypass flow path 58 is defined radially inward of the bypass flow path 56 and the core flow path 60 is radially inward of the bypass flowpath 58.

Hot core gases exiting the LPT 36 may be mixed with the second stream bypass flow path 58 at mixed flow exhaust nozzle 61. It should be understood that various fixed, variable, convergent/divergent, two-dimensional and three-dimensional nozzle systems may be utilized herewith.

The LPT 36C, the ICT 24A and the multi-stage fan 43 are coupled by shaft 38 to define the first spool. The LPT 36B is coupled by shaft 40 to the bypass fan 34 directly or through the geared architecture 42G to define the second spool. The ICT 24B, the LPC 26, and the LPT 36A are coupled by shaft 42 to define the third spool. The HPC 28 and the HPT 32 are coupled by shaft 46 to define the fourth spool. The LPT 36C is the last turbine section within the core flow path 60 and thereby communicates with the mixed flow exhaust nozzle 61 which receives a mixed flow from the second stream bypass flow path 58 and the core flow path 60.

In an embodiment, the ICT 24A includes a bypass flow path 62 formed therein and the ICT 24B includes a bypass flow path 64 formed therein. It should be appreciated that the ICT 24A and 24B each comprise a cold turbine located upstream of the combustor section 30 in the core flow path 60 but each includes turbine blades similar in shape to the turbine blades within the HPT 32 and the LPT 36.

Allowing bypass flow through the bypass flow paths 62 and 64 within respective ICT 24A and 24B for cruise (at altitudes where the ambient air temperature is significantly lower than the ambient air temperature at ground level during takeoff) reduces the intercooling turbine section pressure ratio (ICT PR) and hence reduces the intercooling effect, e.g., the inlet temperature to the LPC 26 will not be significantly decreased. Reducing or eliminating bypass flow through the bypass flow paths 62 and 64 within respective ICT 24A and 24B for takeoff will increase ICT PR and hence increase the intercooling effect, e.g., the inlet temperature to the LPC 26 will be more significantly decreased.

Figures 2, 3:
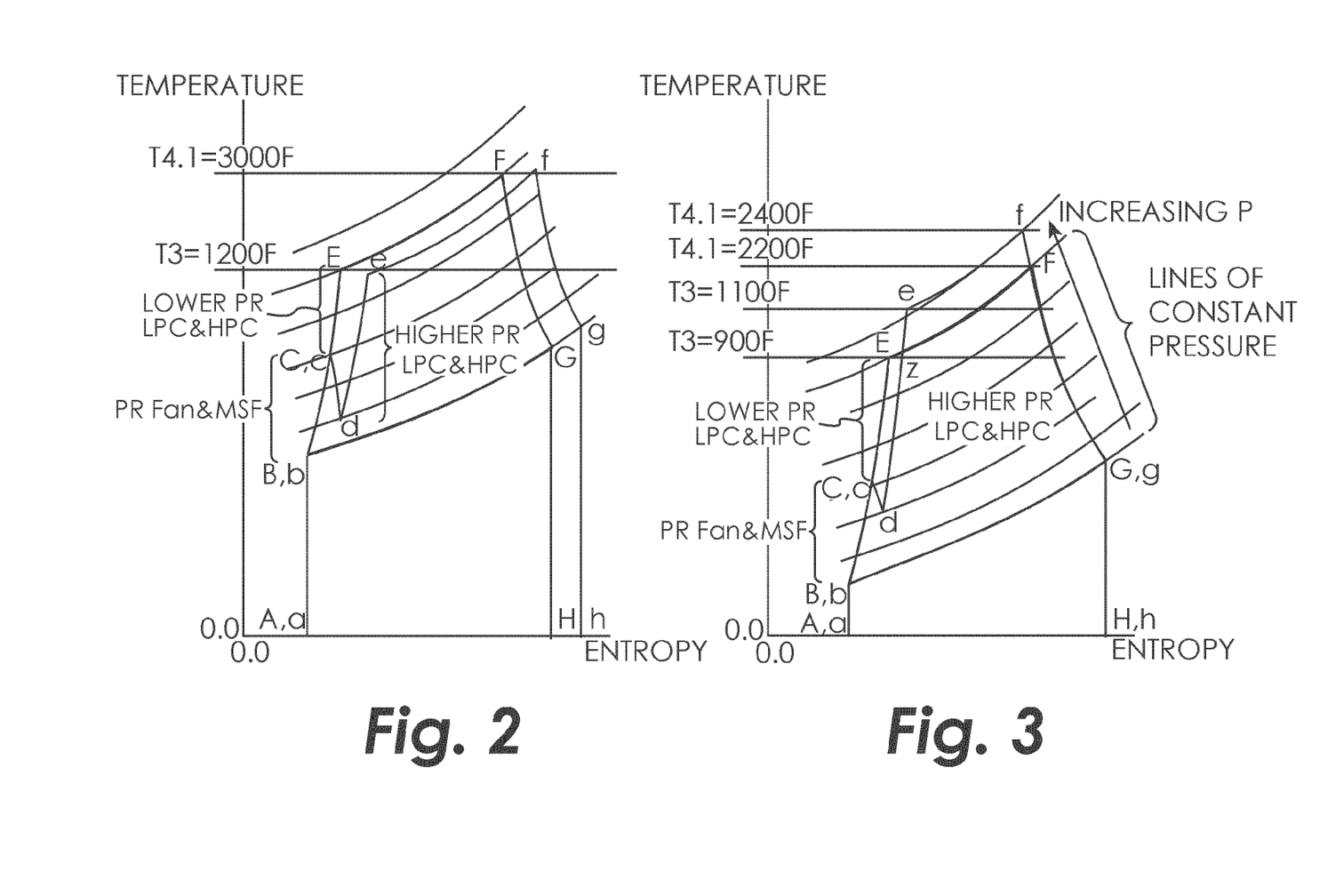
FIG. 2 is a temperature-versus-entropy diagram for a high/hot day take off condition.
FIG. 3 is a temperature-versus-entropy diagram for a cruise condition.

Generally, bypass flow through the bypass flow paths 62 and 64 is reduced or eliminated for takeoff to increase the pressure ratio and intercooling effect to reduce combustor inlet temperature (T3) on hot day takeoff conditions (FIG. 2). Bypass flow through the bypass flow paths 62 and 64 is permitted for cruise to reduce the intercooling turbine expansion pressure ratio (ICT PR) and the intercooling effect (FIG. 3).

Figure 4:
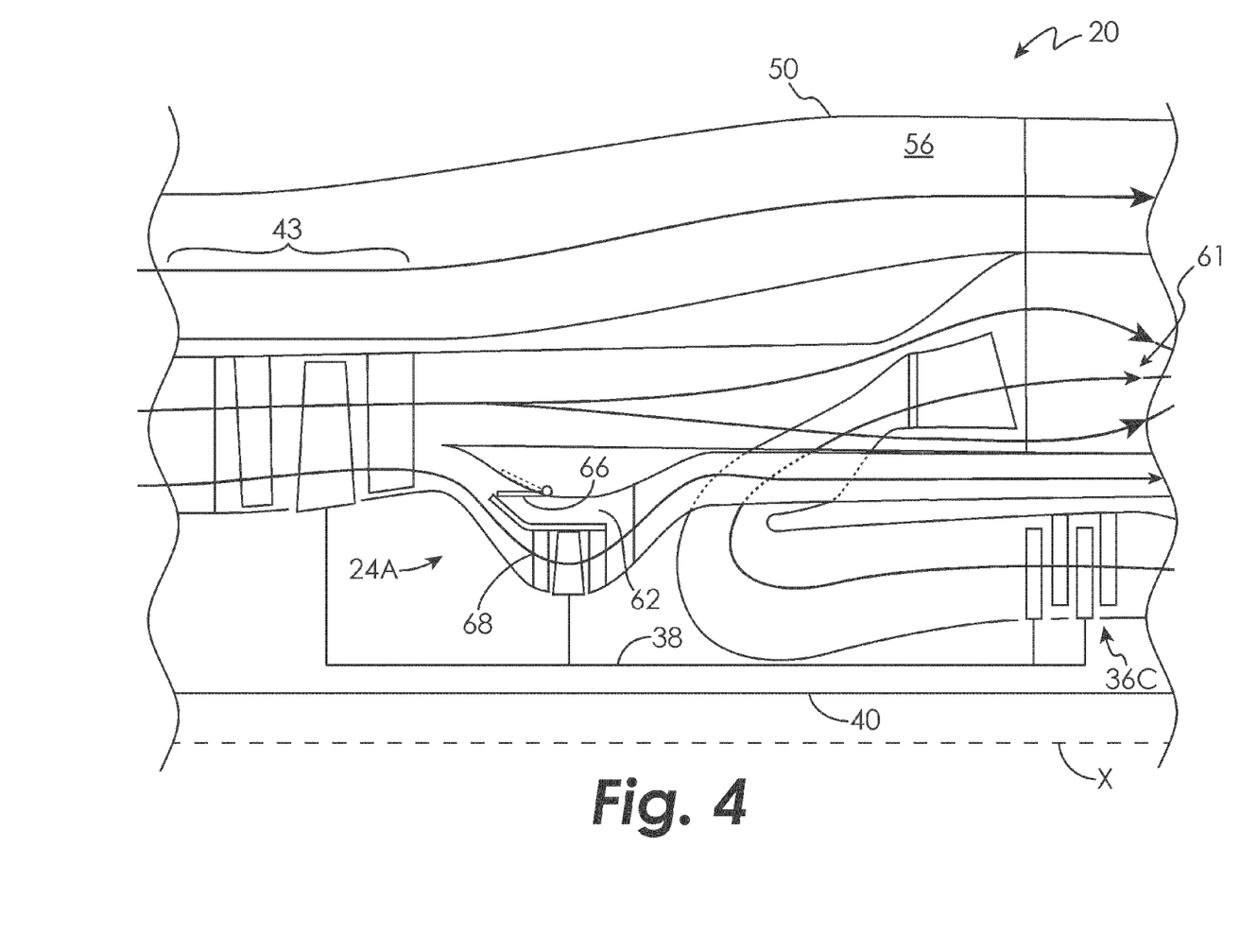
FIG. 4 is a schematic close-up view of an exemplary variable cycle gas turbine engine according to another non-limiting embodiment.
Figure 5:
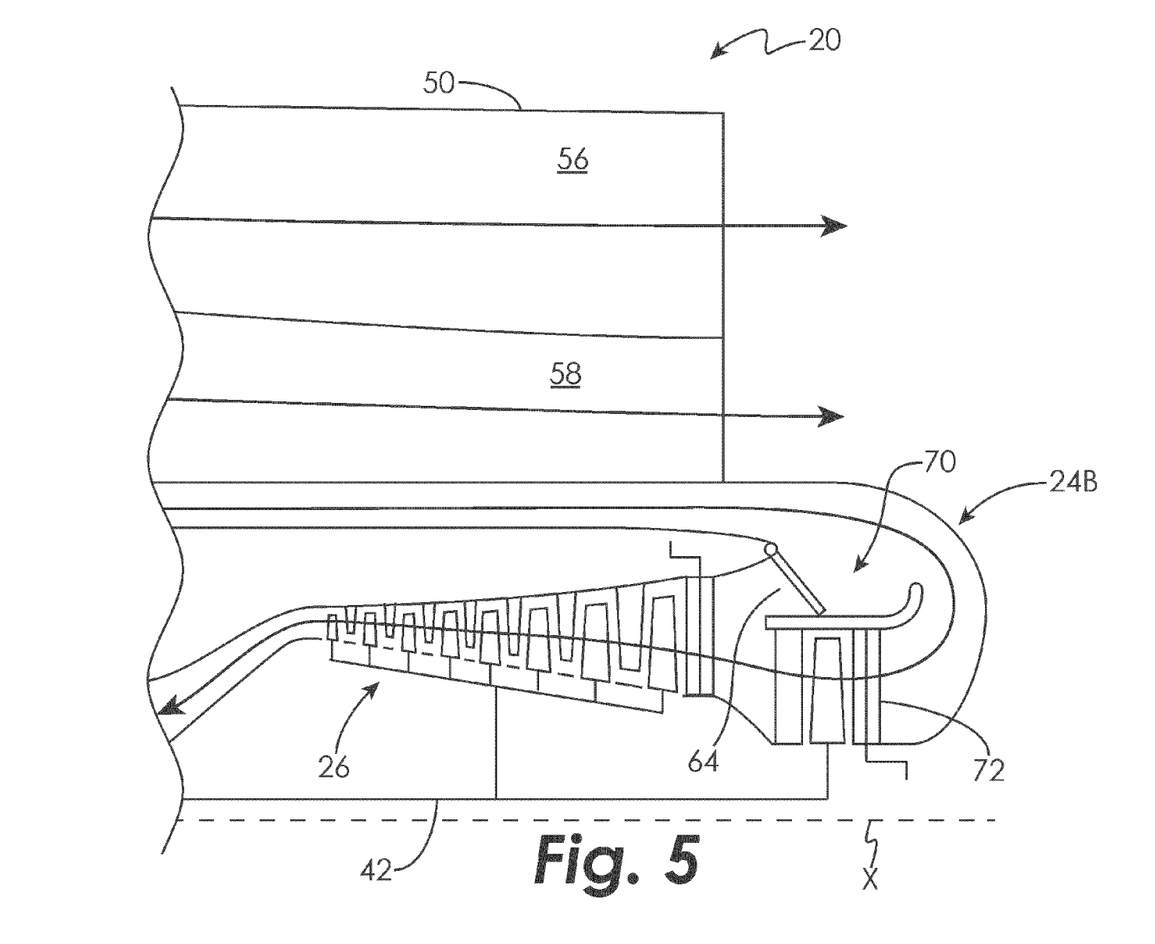
FIG. 5 is a schematic close-up view of an exemplary variable cycle gas turbine engine according to another non-limiting embodiment.

With reference to FIG. 4, an enlarged view of the region of the engine 20 surrounding the first ICT 24A is illustrated. In an embodiment, a first bypass door 66 is provided which when closed reduces or eliminates flow through the bypass flow path 62. As shown in FIG. 4, the first bypass door 66 may be closed during hot day takeoff conditions, forcing all or most of the core gas flow to pass through the turbine section 68 of ICT 24A, causing the core flow gas to be expanded and producing an intercooling effect to the hot ambient air entering the core 60. Similarly, with reference to FIG. 5, an enlarged view of the region of the engine 20 surrounding the second ICT 24B is illustrated. In an embodiment, a second bypass door 70 is provided which when closed reduces or eliminates flow through the bypass flow path 64. As shown in FIG. 5, the second bypass door 70 may be closed during hot day takeoff conditions, forcing all or most of the core gas flow to pass through the turbine section 72 of ICT 24B, causing the core flow gas to be expanded and producing an additional intercooling effect to the hot ambient air flowing in the core 60.

Figure 6:
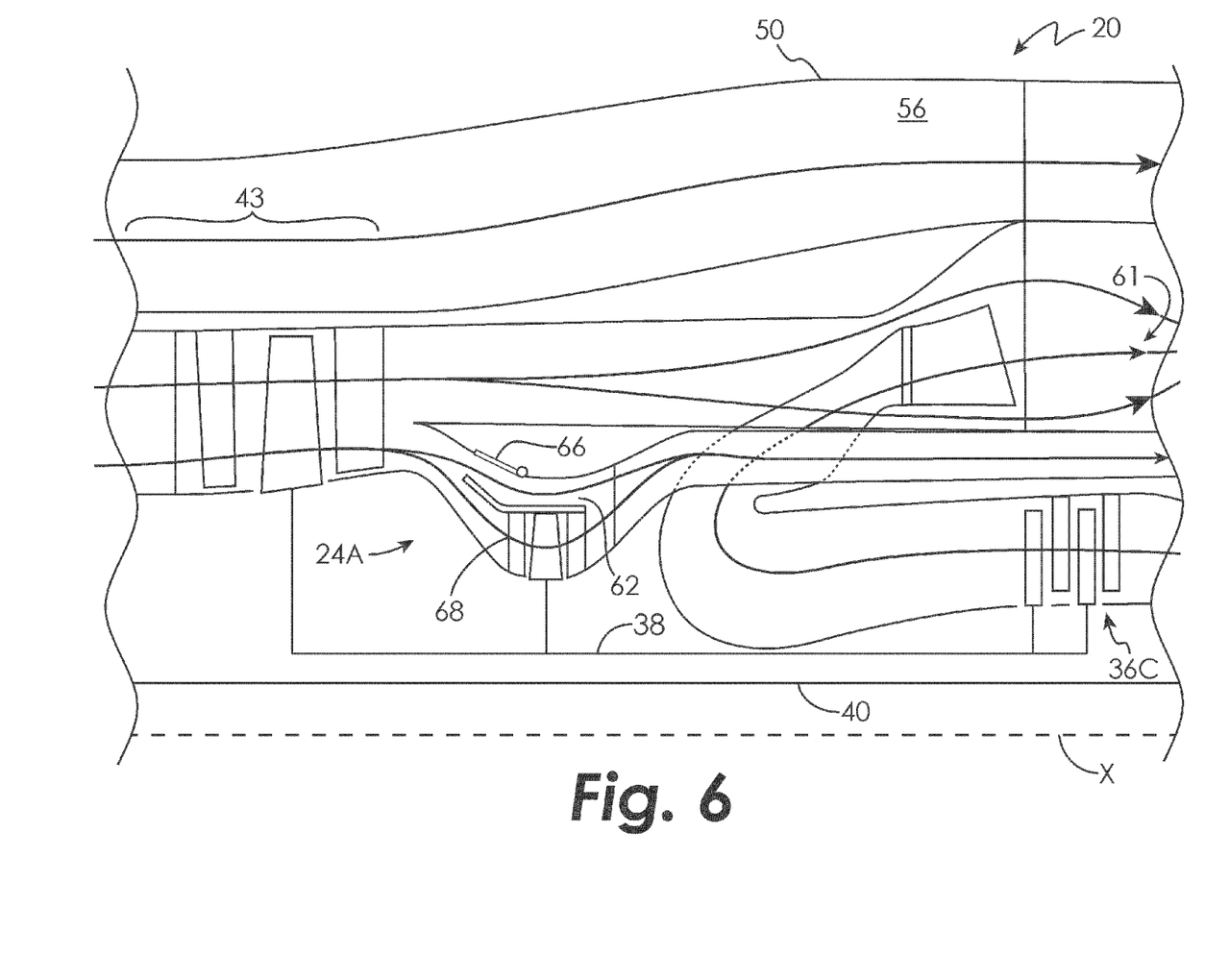
FIG. 6 is a schematic close-up view of an exemplary variable cycle gas turbine engine according to another non-limiting embodiment.
Figure 7:
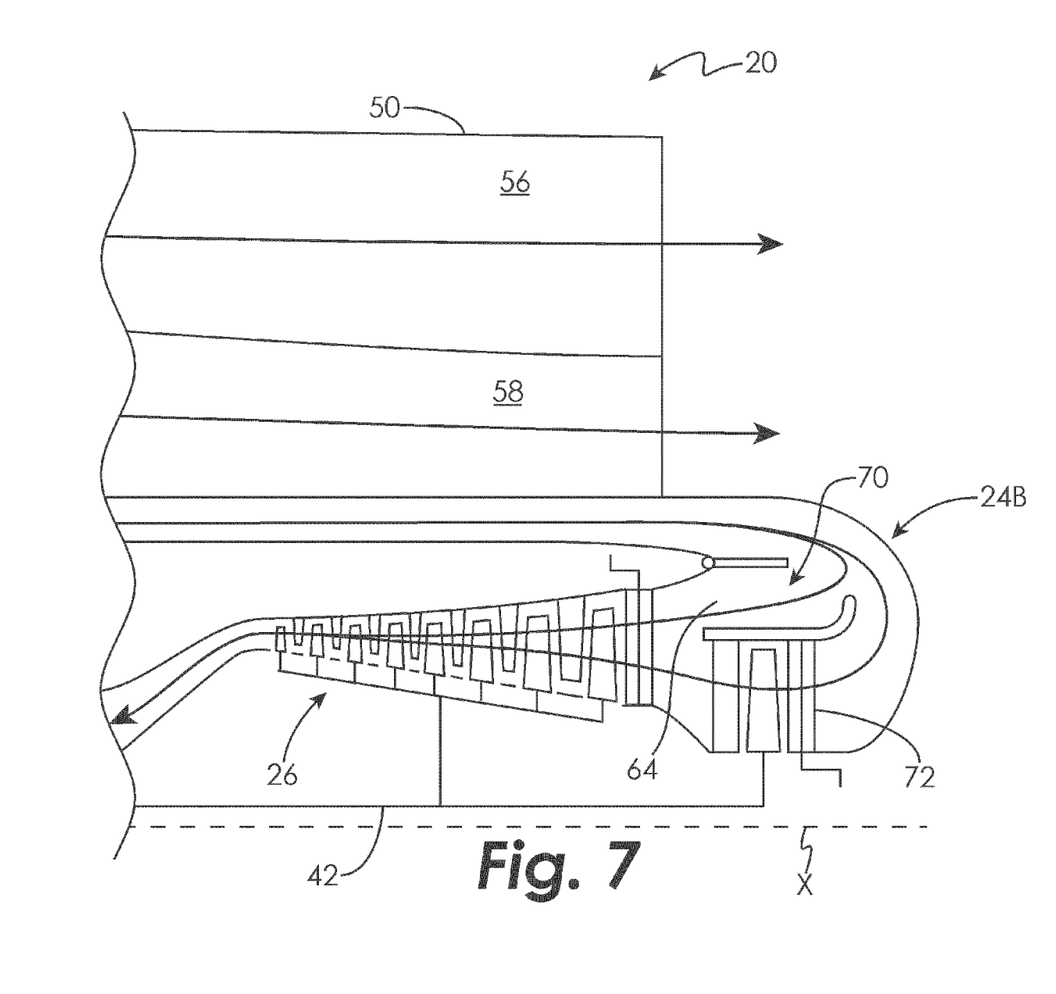
FIG. 7 is a schematic close-up view of an exemplary variable cycle gas turbine engine according to another non-limiting embodiment.

With reference to FIG. 6, an enlarged view of the region of the engine 20 surrounding the first ICT 24A is illustrated. As shown in FIG. 6, the first bypass door 66 may be opened during cruise conditions, allowing some of the core gas flow to pass through the bypass flow path 62. The core flow passing through the bypass flow path 62 does not pass through the turbine section 68 of ICT 24A, causing less of the core flow gas to be expanded and producing a reduced intercooling effect to the relatively cold ambient air entering the core 60. Similarly, with reference to FIG. 7, an enlarged view of the region of the engine 20 surrounding the second ICT 24B is illustrated. As shown in FIG. 7, the second bypass door 70 may be opened during cruise conditions, allowing some of the core gas flow to pass through the bypass flow path 64. The core flow passing through the bypass flow path 64 does not pass through the turbine section 72 of ICT 24B, causing less of the core flow gas to be expanded and producing a reduced additional intercooling effect to the relatively cold ambient air flowing in the core 60.

Figure 8:
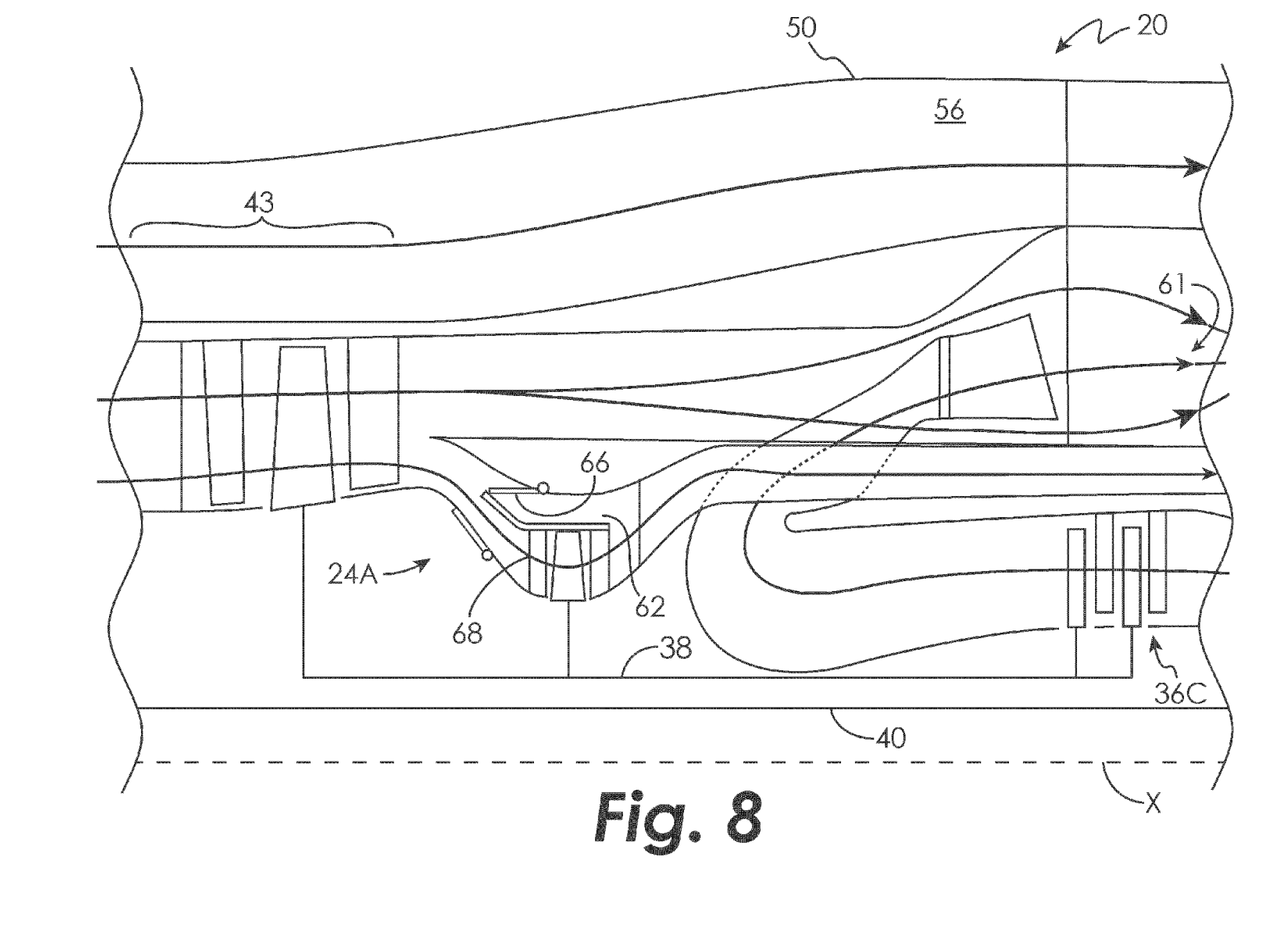
FIG. 8 is a schematic close-up view of an exemplary variable cycle gas turbine engine according to another non-limiting embodiment.

With reference to FIG. 8, an enlarged view of the region of the engine 20 surrounding the first ICT 24A is illustrated. In an embodiment, a third bypass door 74 is provided which when closed reduces or eliminates flow through the turbine section 68. As shown in FIG. 8, the first bypass door 66 may be closed and the third bypass door 74 may be opened during hot day takeoff conditions, forcing all or most of the core gas flow to pass through the turbine section 68 of ICT 24A, causing the core flow gas to be expanded and producing an intercooling effect to the hot ambient air entering the core 60. Similarly, with reference to FIG. 9, an enlarged view of the region of the engine 20 surrounding the second ICT 24B is illustrated.

Figure 9:
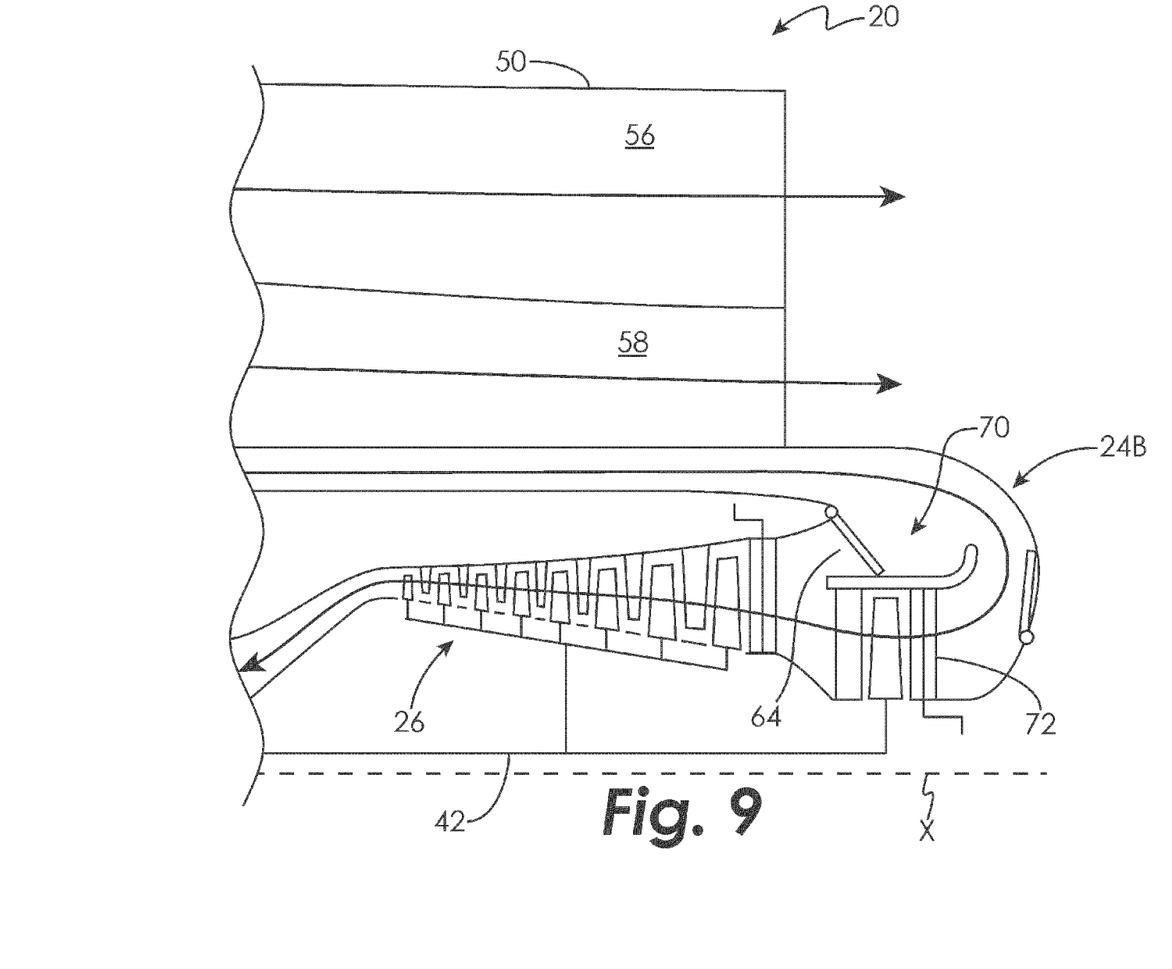
FIG. 9 is a schematic close-up view of an exemplary variable cycle gas turbine engine according to another non-limiting embodiment.

In an embodiment, a fourth bypass door 76 is provided which when closed reduces or eliminates flow through the turbine section 72. As shown in FIG. 9, the second bypass door 70 may be closed and the fourth bypass door 76 may be opened during hot day takeoff conditions, forcing all or most of the core gas flow to pass through the turbine section 72 of ICT 24B, causing the core flow gas to be expanded and producing an additional intercooling effect to the hot ambient air flowing in the core 60.

Figure 10:
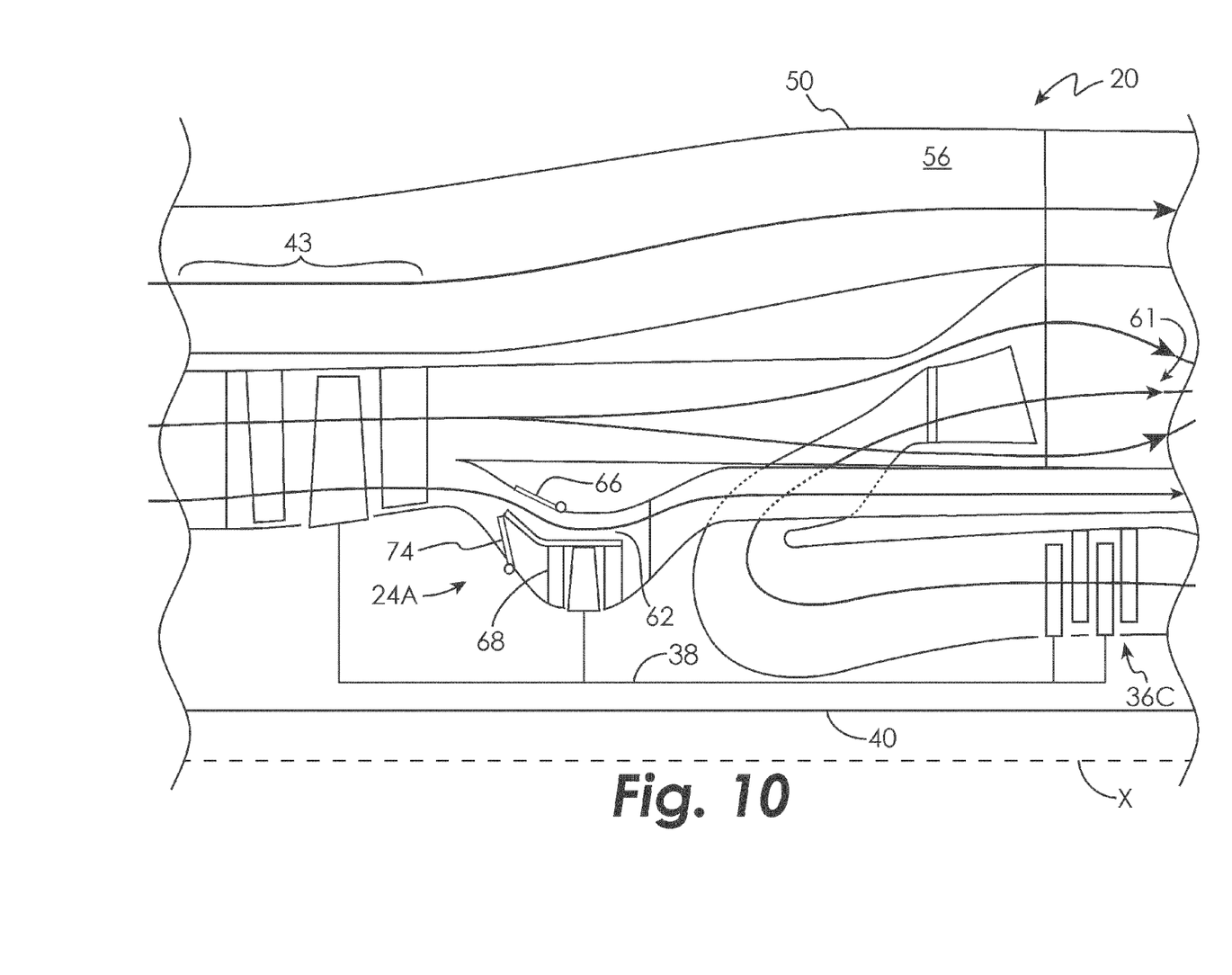
FIG. 10 is a schematic close-up view of an exemplary variable cycle gas turbine engine according to another non-limiting embodiment.
Figure 11:
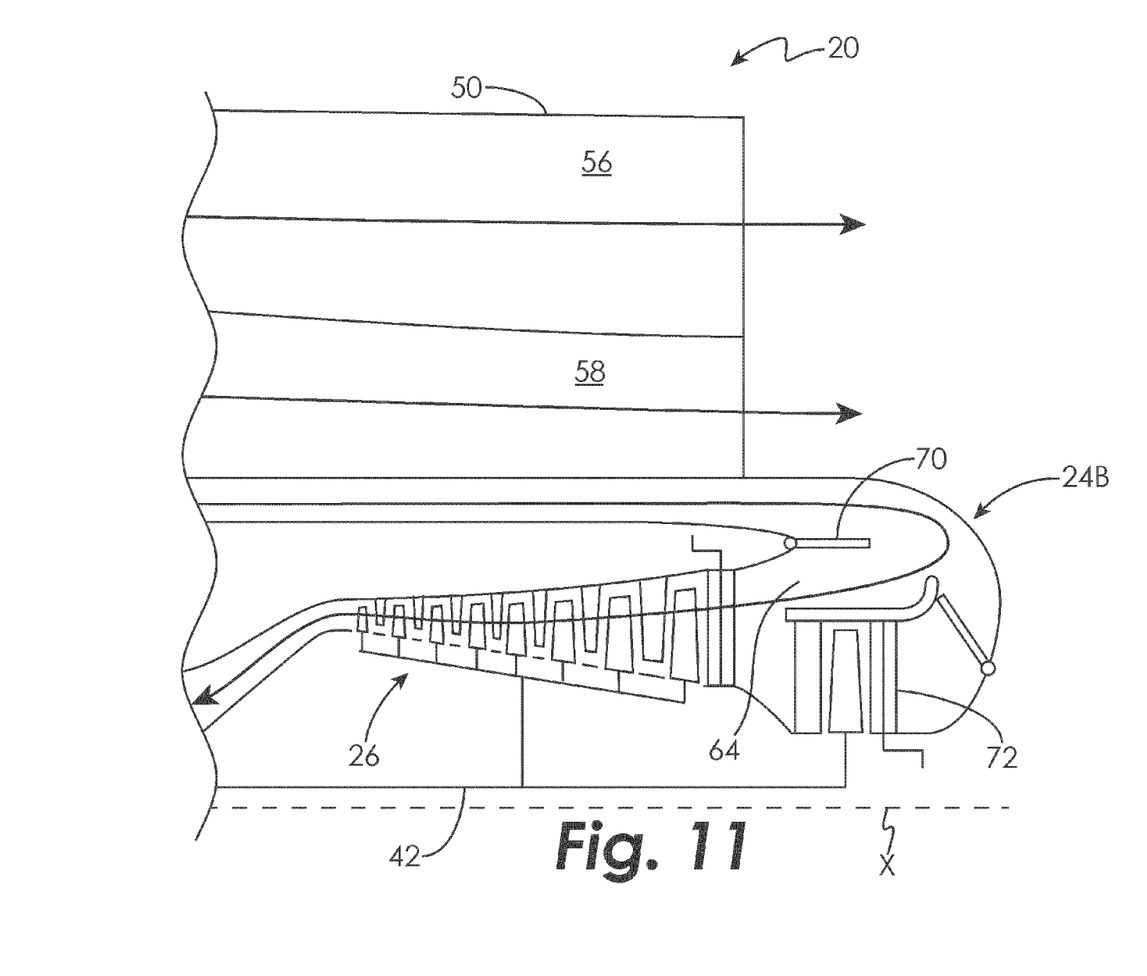
FIG. 11 is a schematic close-up view of an exemplary variable cycle gas turbine engine according to another non-limiting embodiment.

With reference to FIG. 10, an enlarged view of the region of the engine 20 surrounding the first ICT 24A is illustrated. As shown in FIG. 10, the first bypass door 66 may be opened and the third bypass door 74 may be closed during cruise conditions, forcing all or most of the core gas flow to pass through the bypass flow path 62. The core flow passing through the bypass flow path 62 does not pass through the turbine section 68 of ICT 24A, therefore little or none of the core flow gas is expanded, thereby producing little or no intercooling effect to the relatively cold ambient air entering the core 60. Similarly, with reference to FIG. 11, an enlarged view of the region of the engine 20 surrounding the second ICT 24B is illustrated. As shown in FIG. 11, the second bypass door 70 may be opened and the fourth bypass door 76 may be closed during cruise conditions, forcing all or most of the core gas flow to pass through the bypass flow path 64. The core flow passing through the bypass flow path 64 does not pass through the turbine section 72 of ICT 24B, therefore little or none of the core flow gas to be expanded, thereby producing little or no additional intercooling effect to the relatively cold ambient air flowing in the core 60.

In an embodiment, either ICT 24A or ICT 24B may be removed from the engine 20, with the remaining ICT 24 providing the intercooling effect. Additionally, LPT 36B and LPT 36C may be replaced with a single turbine to form a three spool engine in an embodiment, with the single turbine driving all of the forward components. The bypass doors 66, 70, 74 and 76 are disposed circumferentially around the engine axis X, and each may comprise multiple door sections disposed between intervening support struts (not shown) in an embodiment. In another embodiment, the bypass doors 66, 70, 74 and 76 may comprise variable vanes.

With reference to FIGS. 2 and 3, a conventional engine cycle is defined thermodynamically on a Temperature-Entropy diagram by the points A, B, C, E, F, G, H. The priority for improvement of the thermodynamic efficiency of the engine is to increase the area enclosed by the points B, C, E, F, G, but especially doing so by "raising the roof" of points (E) and (F) that correspond respectively to an increase in the overall PR of the engine compression system (E) and an increase in the inlet temperature to the HPT 32 (F).

The inventive engine cycle disclosed herein is defined thermodynamically on the Temperature-Entropy diagram by points a, b, c, d, e, f, g, h. The priority is improvement of the cruise condition efficiency where significant fuel is consumed.

Both the conventional engine and the inventive engine 20 architectures disclosed herein operate at the hot day takeoff condition (FIG. 2) with the same inlet temperature and pressure to the engine: TB=Tb; and PB=Pb, as well as the same temperature and pressure at the exit of the multi-stage fan (MSF) 43: TC=Tc; and PC=Pc.

For the inventive engine disclosed herein the inlet temperature and pressure to the LPC 26 are Td and Pd, respectively. The ICT 24A/24B expands the core flow so that the inlet temperature and pressure to the LPC 26 of the inventive engine are decreased significantly to achieve an intercooling effect on the temperature of compression, that is, Td<TC and Pd<PC.

For both the conventional engine and the inventive engine, the exit condition of the HPC 28 is the inlet condition of the combustor section 30. Both the conventional engine and the inventive engine operate at the hot day takeoff condition with the same combustor inlet temperature (T3), where TE=Te, and with the same HPT 32 first rotor inlet temperature, (T4.1), where TF=Tf. This is consistent with utilization of the same materials and mechanical design technologies for both the conventional and inventive engine.

The pressure ratio (PR) of the LPC 26 and HPC 28 of the inventive engine is significantly higher than the PR of the conventional engine, that is, Pe:Pd>PE:PC. The temperature ratio (TR) of the LPC 26 and HPC 28 of the inventive engine is significantly higher than the TR of the conventional engine, that is, Te:Td>TE:TC. The higher PR of the LPC 26 and HPC 28 of the inventive engine 20 is achievable, for example, with additional compressor section stages.

Neglecting combustor pressure losses, the pressures, PE and PF for the conventional engine are the same. The pressures, Pe and Pf, for the inventive engine are the same, but PE>Pe and PF>Pf; this is attributable to the pressure expansion in the ICT 24.

Both the conventional engine and the inventive engine operate with the same HPT 32 first rotor inlet temperature (T4.1), and TF=Tf at the hot day takeoff condition. At the hot day takeoff condition, both the conventional engine and the inventive engine operate with the same exit pressure from the turbine section so that PG=Pg, but not the same exit temperature from the turbine section, that is, Tg>TG.

The thermodynamic cycle efficiency of an engine generally is proportional to the ratio of two areas on the Temperature-Entropy diagram. That is, the numerator area and the denominator area form this ratio of areas. For the conventional engine, the numerator area is enclosed by the points B, C, E, F, and G, while the denominator area is enclosed by the points H, G, B, and A. For the inventive engine, the numerator area is enclosed by the points b, c, d, e, f, and g, while the denominator area is enclosed by the points h, g, b, and a.

At the hot day takeoff condition, the numerator area of the conventional engine is greater than or equal to the numerator area of the inventive engine, while the denominator area of the conventional engine is less than the denominator area of the inventive engine; thus, the thermodynamic efficiency of the conventional engine is relatively better than the inventive engine at the hot day takeoff condition (FIG. 2).

The priority, however, is to improve the thermodynamic cycle efficiency at the cruise condition where much of the fuel is consumed. Both the conventional engine and the inventive engine operate at the cruise condition with the same inlet temperature and pressure to the engine: TB=Tb and PB=Pb. Note that the inlet temperature and pressure at the cruise condition (FIG. 3) are less than the inlet temperature and pressure at the hot day takeoff condition (FIG. 2).

At the cruise condition, both the conventional and inventive engine have the same temperature and pressure at the exit of the MSF 43; TC=Tc and PC=Pc. For the inventive engine 20, the inlet temperature and pressure to the LPC 26 are Td and Pd, respectively. At the cruise condition, the ICT 24 expands the exit flow of the MSF 43 so that the inlet temperature and pressure to the LPC 26 of the inventive engine are not decreased significantly to obtain a smaller intercooling effect on the temperature within the compressor section; regardless, Td<TC and Pd<PC.

The expansion of the ICT 24 is selectively less at the cruise condition and this is obtained by use of the bypass doors 66, 70, 74 and 76. At the cruise condition as well as the hot day takeoff condition, the LPC 26 and HPC 28 of the inventive engine 20 has a higher PR than the conventional engine and the higher PR is achieved for example, with additional stages of compression in the LPC 26 and HPC 28. The pressure ratio (PR) of the LPC 26 and HPC 28 of the inventive engine is significantly higher than the PR of the conventional engine, that is, Pe:Pd>PE:PC. The temperature ratio (TR) of the LPC 26 and HPC 28 of the inventive engine is significantly higher than the TR of the conventional engine, that is, Te:Td>TE:TC. At the cruise condition, the HPC 28 exit pressure and exit temperature of the inventive engine are higher than the conventional engine, that is, Pe>PE and Te>TE.

For both the conventional engine and the inventive engine, the exit condition of the HPC 28 is the inlet condition of the combustor section 30. Neglecting combustor pressure losses, the pressures, PE and PF for the conventional engine are the same. The pressures, Pe and Pf for the inventive engine are the same, but at the cruise condition, Pe>PE, and Pf>PF; this is attributed to the deliberately smaller expansion of pressure in the ICT 24 and the higher PR of the LPC 26 and HPC 28 of the inventive engine.

Application of the same materials and mechanical design technologies to both the conventional and inventive engine is limiting at the hot day takeoff condition but not at the cruise condition provided T3 and T4.1 at the cruise condition are lower than at the hot day takeoff condition.

At the cruise condition, HPT 32 first rotor inlet temperature (T4.1) of the inventive engine is greater than T4.1 of the conventional engine; that is, Tf>TF at the cruise condition. At the cruise condition, both the conventional engine and the inventive engine operate with the same exit pressure of the turbine section so that PG=Pg, and the same exit temperature from the turbine section, TG=Tg.

With reference to FIG. 3, at the cruise condition, the numerator area of the inventive engine is greater than the numerator area of the conventional engine, while the denominator areas of the conventional engine and the inventive engine are the same; thus, the thermodynamic efficiency of the inventive engine is greater than the conventional engine at the cruise condition. The larger numerator area of the inventive engine is evident by comparison between the two sectional areas of the Temperature-Entropy diagram at the cruise condition.

The first sectional area is enclosed by the points z, e, f, and F, while the second sectional area is enclosed by the points C, E, z, and d. The first sectional area yields an increase in the numerator area of the inventive engine. The first sectional area is greater than the second sectional area to yield a net increase in the numerator area of the inventive engine disclosed herein versus the numerator area of the conventional engine.

The ICT 24 effectively "raises the roof" of the thermodynamic cycle of the engine at the cruise condition with the same materials and mechanical design constraints as a conventional engine architecture at the hot day takeoff condition.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the engine but should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A gas turbine engine comprising:
   a combustor section;
   a first spool along an engine axis with a first turbine section, said first turbine section downstream of said combustor section to receive a core flow along a core flow path;
   a second spool along said engine axis with a low pressure compressor section and a second turbine section, said low pressure compressor section upstream of said combustor section to receive said core flow along said core flow path;
   a first intercooling turbine section upstream of said combustor section to receive said core flow along said core flow path;
   a first intercooling turbine section bypass to selectively bypass at least a portion of said core flow through a first intercooling turbine section bypass path around said first intercooling turbine section;
   a second intercooling turbine section upstream of said combustor section to receive said core flow along said core flow path; and
   a second intercooling turbine section bypass to selectively bypass at least a portion of said core flow through a second intercooling turbine section bypass path around said second intercooling turbine section.

2. The gas turbine engine as recited in claim 1, wherein said first intercooling turbine section is driven by said first spool.

3. The gas turbine engine as recited in claim 1, wherein said second intercooling turbine section is driven by said second spool.

4. The gas turbine engine as recited in claim 1, wherein said first intercooling turbine section includes a first bypass door positionable at a first bypass door first position and a first bypass door second position.

5. The gas turbine engine as recited in claim 4, wherein positioning said first bypass door at the first bypass door first position allows said core flow to flow through said first intercooling turbine section bypass path.

6. The gas turbine engine as recited in claim 4, wherein positioning said first bypass door at the first bypass door second position substantially prevents said core flow from flowing through said first intercooling turbine section bypass path.

7. The gas turbine engine as recited in claim 1, wherein said first intercooling turbine section includes a second bypass door positionable at a second bypass door first position and a second bypass door second position.

8. The gas turbine engine as recited in claim 7, wherein positioning said second bypass door at the second bypass door first position allows said core flow to flow through said first intercooling turbine section.

9. The gas turbine engine as recited in claim 7, wherein positioning said second bypass door at the second bypass door second position substantially prevents said core flow from flowing through said first intercooling turbine section.

10. The gas turbine engine as recited in claim 1, wherein said second intercooling turbine section includes a third bypass door positionable at a third bypass door first position and a third bypass door second position.

11. The gas turbine engine as recited in claim 10, wherein positioning said third bypass door at the third bypass door first position allows said core flow to flow through said second intercooling turbine section bypass path.

12. The gas turbine engine as recited in claim 10, wherein positioning said third bypass door at the third bypass door second position substantially prevents said core flow from flowing through said second intercooling turbine section bypass path.

13. The gas turbine engine as recited in claim 1, wherein said second intercooling turbine section includes a fourth bypass door positionable at a fourth bypass door first position and a fourth bypass door second position.

14. The gas turbine engine as recited in claim 13, wherein positioning said fourth bypass door at the fourth bypass door first position allows said core flow to flow through said second intercooling turbine section.

15. The gas turbine engine as recited in claim 13, wherein positioning said fourth bypass door at the fourth bypass door second position substantially prevents said core flow from flowing through said second intercooling turbine section.

16. A gas turbine engine comprising:
   a combustor section;
   a first spool along an engine axis with a first turbine section, said first turbine section forward of said combustor section to receive a core flow along a core flow path;
   a second spool along said engine axis with a low pressure compressor section and a second turbine section, said low pressure compressor section aft of said combustor section to receive said core flow along said core flow path;
   a first intercooling turbine section forward of said combustor section to receive said core flow along said core flow path;
   a first intercooling turbine section bypass to selectively bypass at least a portion of said core flow through a first intercooling turbine section bypass path around said first intercooling turbine section;
   a second intercooling turbine section aft of said combustor section to receive said core flow along said core flow path; and
   a second intercooling turbine section bypass to selectively bypass at least a portion of said core flow through a second intercooling turbine section bypass path around said second intercooling turbine section.

17. The gas turbine engine as recited in claim 16, wherein said first intercooling turbine section is driven by said first spool.

18. The gas turbine engine as recited in claim 16, wherein said second intercooling turbine section is driven by said second spool.

19. The gas turbine engine as recited in claim 16, wherein said first intercooling turbine section includes a first bypass door positionable at a first bypass door first position and a first bypass door second position.

20. The gas turbine engine as recited in claim 19, wherein positioning said first bypass door at the first bypass door first position allows said core flow to flow through said first intercooling turbine section bypass path.

21. The gas turbine engine as recited in claim 19, wherein positioning said first bypass door at the first bypass door second position substantially prevents said core flow from flowing through said first intercooling turbine section bypass path.

22. The gas turbine engine as recited in claim 16, wherein said first intercooling turbine section includes a second bypass door positionable at a second bypass door first position and a second bypass door second position.

23. The gas turbine engine as recited in claim 22, wherein positioning said second bypass door at the second bypass door first position allows said core flow to flow through said first intercooling turbine section.

24. The gas turbine engine as recited in claim 22, wherein positioning said second bypass door at the second bypass door second position substantially prevents said core flow from flowing through said first intercooling turbine section.

25. The gas turbine engine as recited in claim 16, wherein said second intercooling turbine section includes a third bypass door positionable at a third bypass door first position and a third bypass door second position.

26. The gas turbine engine as recited in claim 25, wherein positioning said third bypass door at the third bypass door first position allows said core flow to flow through said second intercooling turbine section bypass path.

27. The gas turbine engine as recited in claim 25, wherein positioning said third bypass door at the third bypass door second position substantially prevents said core flow from flowing through said second intercooling turbine section bypass path.

28. The gas turbine engine as recited in claim 16, wherein said second intercooling turbine section includes a fourth bypass door positionable at a fourth bypass door first position and a fourth bypass door second position.

29. The gas turbine engine as recited in claim 28, wherein positioning said fourth bypass door at the fourth bypass door first position allows said core flow to flow through said second intercooling turbine section.

30. The gas turbine engine as recited in claim 28, wherein positioning said fourth bypass door at the fourth bypass door second position substantially prevents said core flow from flowing through said second intercooling turbine section.

* * * * *